United States Patent [19]

Frankl

[11] 3,982,499
[45] Sept. 28, 1976

[54] CONVERSION OF ANIMAL WASTE

[76] Inventor: Gerald P. Frankl, 342 Security Bank Bldg., Sioux City, Iowa 51101

[22] Filed: Jan. 30, 1975

[21] Appl. No.: 545,584

[52] U.S. Cl. .................................. 119/16; 119/28; 210/152; 210/195 R; 210/386
[51] Int. Cl.² ............................................ A01K 1/00
[58] Field of Search ................. 119/16, 28; 210/386, 210/152, 195 M, 400

[56] References Cited
UNITED STATES PATENTS

| | | | |
|---|---|---|---|
| 3,049,236 | 8/1962 | DeLara et al. | 210/400 X |
| 3,273,494 | 9/1966 | Cocchiarella | 210/386 X |
| 3,633,547 | 1/1972 | Stevens et al. | 119/16 |
| 3,897,341 | 7/1975 | Ozawa | 210/386 |

Primary Examiner—J.N. Eskovitz
Attorney, Agent, or Firm—Reilly and Hancock

[57] ABSTRACT

Dry and liquid feed supplements are recovered from treating animal wastes collected from a confinement feeding area for livestock and the like by a closed loop type of collection system including a primary liquid storage tank. Solids and liquids are separated from the collected wastes by dynamic liquid filtering apparatus including a unique compression filter. Liquid is withdrawn near the surface of the primary tank, passed through a second solid/liquid separating filter and transferred to a secondary tank. Preferably rarified oxygen is forced into both tanks so as to aerate the liquids. After appropriate aerobic digestion or oxidation, the secondary tank liquids are used to supplement feed water and the solids are used to supplement dry feed ration.

27 Claims, 7 Drawing Figures

FIG 1

CONVERSION OF ANIMAL WASTE

BACKGROUND OF THE INVENTION

This invention relates to methods and apparatus for recovering livestock feed supplements from animal wastes. More particularly, the present invention relates to methods and apparatus for separating the solids and liquids from animal wastes from a flush-type facility and the treatment of these separated materials in a manner suitable for recycling as animal feed supplements. The present invention is particularly useful for confinement feeding facilities such as for feeding of livestock.

As evidenced in recent years the world demand for feedstuffs, usually considered to be livestock feed ingredients, has outstripped supply at least at historic price levels. As the world population continues to increase, and the living standards of these populations also increases, upward price exertions will remain on those feed ingredients for which livestock and people directly compete. All phases of the cattle producing industry have been continually cost-price sensitive. The cost of energy, roughage and protein sources available to the cattle industry have significantly increased and the value of the finished product has been drastically reduced. It is imperative that production costs be reduced by lower ingredient costs or improving efficiencies.

The concentration of production and availability of feed grain and cellulose in certain geographical areas such as the so-called Corn Belt of the United States indicates an economic advantage in raising and feeding livestock in those areas. For various reasons such as protection from climatic hazards, it is particularly attractive to feed such livestock in confinement. Wherever there is proximity to more densely populated areas, the control of air and water pollution relative to such confinement feeding systems is further important particularly relative to the waste handling and treatment. Thus, it is attractive to provide systems which permit recycling of the wastes as animal feed supplements.

Certain classes of livestock are much more inefficient users of feedstuffs than others. For instance, beef cattle on a fattening ration require at least seven pounds of ration (10% moisture) to produce one pound of gain. According to the National Academy of Science investigations on nutrient requirements of beef cattle, beef cattle require an equal amount of energy for production and body maintenance if they are performing at a near optimal level. Therefore, only 28 ½% of all of the feed consumed by beef cattle on a fattening ration is actually utilized. The remainder is passed through in the form of animal excrement.

Livestock waste continues to represent a major problem to society and to the livestock feeding industry. To comply with pollution regulations, many livestock operators have improved their facilities to meet these requirements, but their production costs have also increased. The most practical solution to the problems of pollution and increased ration costs is to reclaim, process and recycle the waste from cattle that are being fed in confinement feed lot facilities. Accordingly, various efforts have been directed towards waste recycling in the agricultural industry. For many years cattle feeders have allowed swine to follow cattle in the feed lot. The purpose of this practice was to allow swine to recover a portion of the undigested solids from the cattle waste and convert them into pork. Considerable research, and practical application, has been conducted in the area of recycling poultry waste litter through other classes of livestock. Further, one system for producing feed supplements from poultry is shown in U.S. Pat. No. 3,813,288 by Stribling et al.

During recent years many research projects have been conducted to measure the performance of beef cattle that were fed a ration that contains processed beef cattle waste as a portion of their ration. The premise behind these research tests was to substitute not only energy, but all or a portion of the protein in the ration with protein derived from beef cattle waste. It would appear that feedlot cattle waste when properly collected and processed can be included to make up a part of cattle rations and the performance of cattle on feed is not adversely affected.

Numerous chemical tests have been conducted on feedlot cattle waste to determine levels of protein, dry matter digestibility, calcium, etc. Such research has determined that the amount of protein in fresh feedlot cattle excrement was 6.01%. When converted to a dry matter basis this excrement contained 30.74% protein.

Assuming that an 850 pound steer consumes 21.50 pounds of air dry ration (10% moisture) per day, along with a 28 ½% utilization factor, only 5.50 pounds of a typical "hot feedlot ration" is utilized by the animal. The remainder of the ration, 13.85 pounds, is passed through in the excrement. As shown in certain "in-vitro" tests, about 70% of the dry matter in this portion of the ration passed through the animal undigested. On a dry matter analysis the digestibility of cattle excrement compares favorably to typical corn silage.

Recent research conducted at Iowa State University has shown that cattle performance when fed ensiled waste excrement is equal to the preformance of cattle that were fed whole-plant corn silage. Thus, there is a tremendous economic potential to the confinement cattle feeding industry if the undigested solid portion of the ration is reclaimed.

Summarizing, various efforts have been applied to recover the food value from the animal wastes as supplements. For confinement cattle feeding barns, there are further a variety of flushable flume configurations for recovering wastes such as are shown in U.S. Pat Nos. 2,233,766 by Bogert, 3,137,270 by Rigertink et al and 3,530,831 by Conover. Further, oxidation of these wastes such as through intensive aeration in storage reservoirs has been pursued. Various methods of inducing air into such collected wastes have also been used. Some research has indicated that up to 50% of the animal wastes from feed lot cattle can be recycled as food supplements except for the final month or two before marketing. Various processes of treatment and silage storage have been suggested, and the recovered silage ration indicates weight gains comparable to cattle fed on whole corn silage ration supplemented with various other additives. Some examples of treatment and separation systems can be found in U.S. Pat. Nos. 2,270,869 by Ditto et al, 3,462,275 by Bellamy and 3,633,547 by Stevens et al. The Stevens et al patent shows a closed loop type confinement feeding system wherein fermented and sterilized solids are automatically added to the feed slurry.

SUMMARY OF THE INVENTION

The present invention is a method and apparatus for maximizing the efficiency of livestock feeding by recovering the animal wastes which contain a high percentage of livestock feed value, separating the solids are liquids from such recovered wastes and treating the separated materials so that they are suitable for introduction to the feed of the livestock as supplements. The animal wastes are flushed from the confinement feed area and an initial separation of the solids and liquids is performed by a screen filter. One feature of this invention relates to a novel roller arrangement for forcibly removing the liquids from the solids by a pressure roll against a conveyor belt in an endless loop configuration with wedge wire filtering immediately prior to the roller and also relative to the roller periphery. The liquids thus separated are introduced to an aeration tank where they are coupled with aerobic material and oxidized. This treated liquid waste is further used for subsequent flushing of the confinement feeding area. Overflow from the initial aeration tank is further filtered through a wedge wire screening arrangement and introduced to an additional aeration tank. After suitable treatment in the second aeration tank, the finally oxidized liquids are employed as a supplement to the livestock feed water system. The substantially dried solids are available as direct dry feed supplements for the animal ration.

Accordingly, it is a primary object of the present invention to provide a method and apparatus for recovering animal feed value from animal wastes.

A further object of the present invention is to provide a method and apparatus for producing livestock feed supplements from the collected waste materials associated with operation of a confinement feeding facility.

A still further object of the present invention is to provide process and apparatus for separating solids and liquids from collected animal wastes and treating the separated materials so as to produce a suitable livestock feed supplement.

Yet another object of this invention is to provide a novel arrangement for dynamically separating solids and liquids from a mixture thereof.

Further objects, advantages and features of the present invention will be more readily apparent in view of the following detailed description of a preferred embodiment.

DETAILED DESCRIPTION OF THE PREFERRED EMBODIMENT

Figure 1:
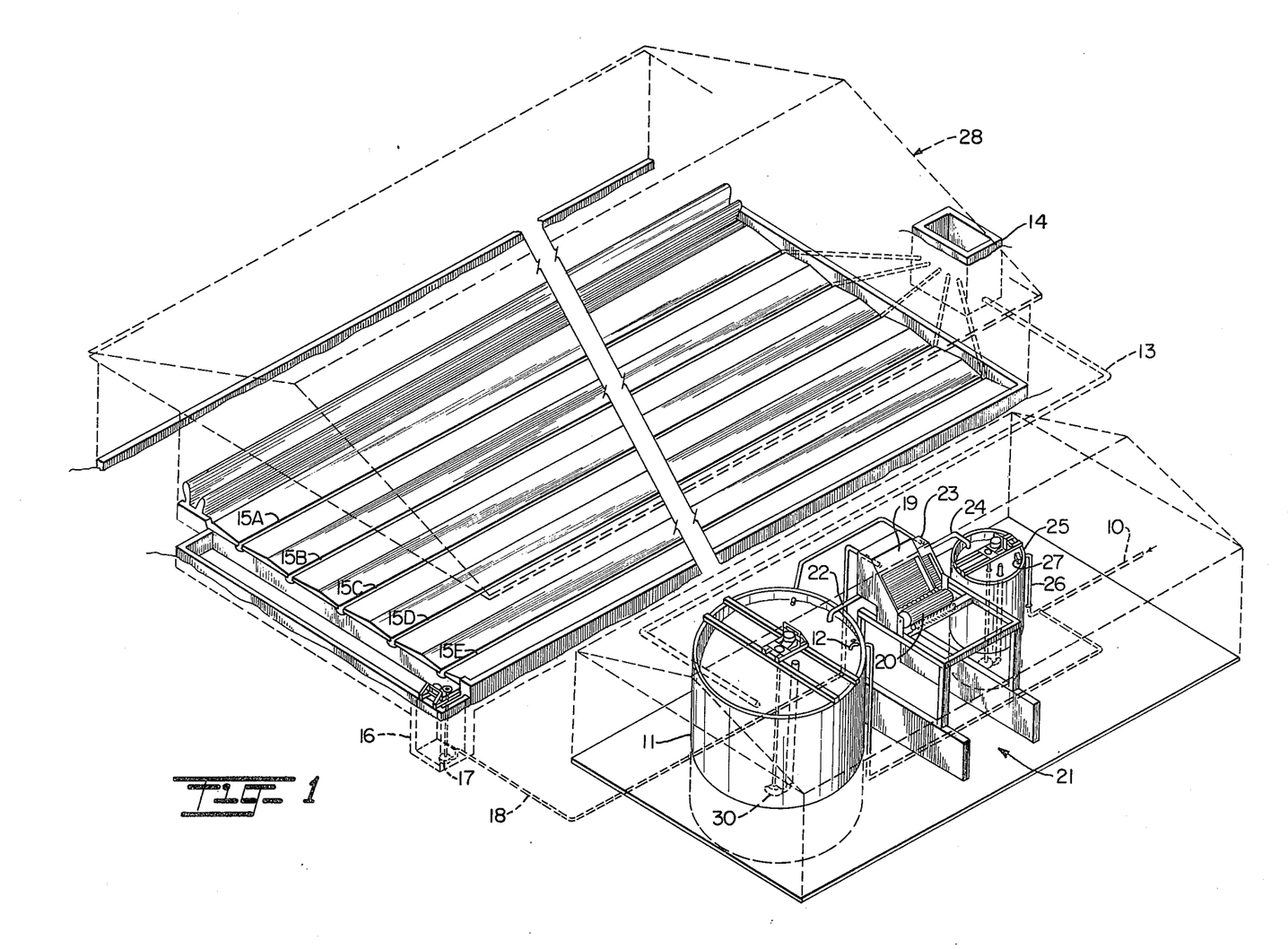
FIG. 1 illustrates an arrangement for livestock feed supplementation recovery in accordance with the present invention relative to a confinement feeding facility.

The present invention is preferably useful in conjunction with flush type livestock confinement barns and will be described in detail relative to a typical such barn 28 but it is to be recognized that the invention is not limited to the confinement barn configuration as shown. Fresh water is introduced at pipe 10 and the system is initialized by filling primary aeration tank 11 therefrom. Tank valve 12 is provided for allowing water into tank 11, which will eventually become the liquid portion of the wastes recycling system. Further, the content of tank 11 flows by gravity through underground pipe 13 to the upper end of the confinement feeding barn. The effluent from tank 11 enters the bottom of the splitter box 14 to be divided into as many parts as there are flumes or surge tanks 15. Flumes 15 can be continuously or periodically flushed clean by flooding either sequentially or all at once as desired.

The liquid from flumes 15 flows to the lower end of the barn by gravity feed and carries the wastes to the sump 16. Sump pump 17 pumps the wastes through pipe 18 to the wedge wire filter apparatus 19 where much of the liquid is removed. The solids gravitate down the screen to the rotary press 20. Press 20 extracts more liquid from the solid portion of the wastes and discharges the solids at approximately 65% moisture into the solids holding bin 21. The liquid portion of the wastes flows through pipe 22 back into primary aeration tank 11 for aerobic treatment. Overflow from tank 11 flows over the additional wedge wire screen filter 23. Wedge wire screen filter 23 typically is a screen with approximately 0.005 inch openings between solid wedge shaped bars. The small opening slots of such a screen remove most of the liquid from the remaining solids from the overflow of tank 11 and these solids will be primarily inert since they have been aerobically digested in tank 11. These solids are likewise discharged into holding bin 21. The liquid flows from screen filter 23 through pipe 24 into a final aeration tank 25. Fresh water from source 10 can also be piped into tank 25 through fresh water line 26 and a level maintained constantly in tank 25 by a conventional float valve 27.

Sloped wedge wire screens for liquid separation by gravity feed have been applied in several industries. A variety of such screens are commercially available. As applied in conjunction with this invention, the screen size may vary depending upon such factors as the type of animal involved, the type of ration being fed to the animals, etc. For a typical cattle feeding environment, the screen for filter 19 typically will have 0.010 inch spacings between bars with the flat surface of such bars being approximately 3/16 inch and the thickness of the bars in the top screen being approximately ¼ inch.

In a typical configuration such as for supporting about five hundred steers, tank 11 and tank 25 extend approximately 11' and 9', respectively, above the surface of the confinement area. This allows enough head pressure to flush the barn by gravity flow from tank 11 and also provides enough head pressure from tank 25 to force the aerobic treated waste liquids mixed with fresh water to the automatic livestock waterers in the barn (not shown).

Figures 4, 5, 7:
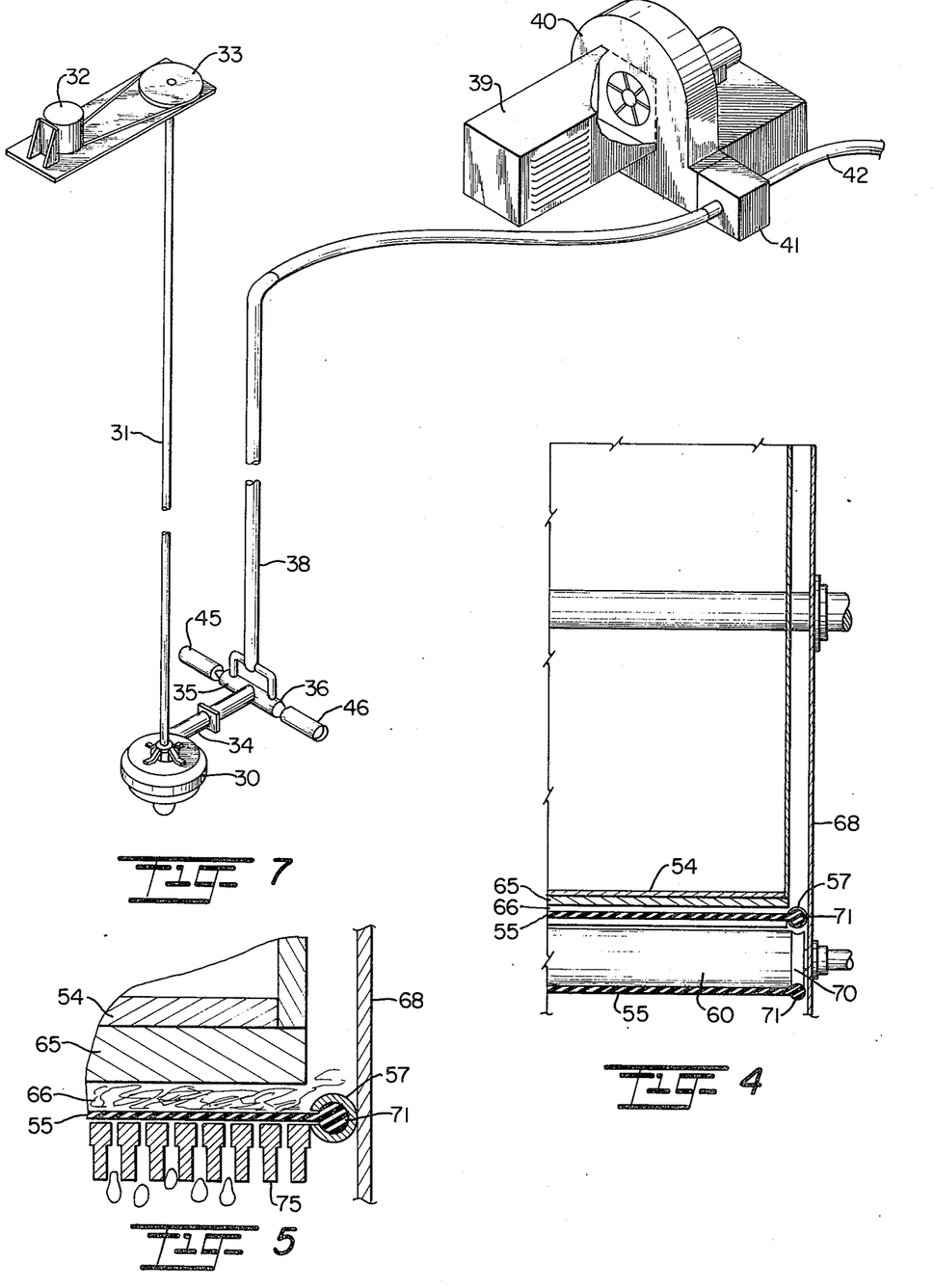
FIG. 4 shows a partially sectioned view of the apparatus of FIG. 2 taken along section line 4—4.
FIG. 5 shows the detail of the interrelationship of the drum, belt and wedge wire basket of FIGS. 2, 3 and 4.
FIG. 7 shows the detail of an aerator system.

As shown in FIG. 7, the aerators installed in tanks 11 and 25 utilize high volume, low pressure pumps 30 with the impeller mounted horizontally. The power shaft 31 runs vertically from the bottom of each tank to the surface or top of the aeration tanks 11 and 25 where electric motors 32 are mounted for belt driving pulleys such as 33 and thus drive power shaft 31. The liquid is received into the pump from the center of both top and bottom of the housing of pump 30 which is positioned slightly above the bottom of the tank. The liquid is forced through the pump discharge 34, the flow is split and forced through two venturi units 35 and 36, air is supplied to these venturis through a plastic pipe 38 that extends from the bottom of a tank to above the liquid surface as shown in FIG. 7. Air pump 40 drives the air into plenum chamber 41 where it is appropriately split and introduced to pipes 38 and 42, the latter terminating in a similar venturi assembly in tank 25. The air is broken up and dispersed into the liquid by means of diffusers 45 and 46. Due to the depth of the pump and baffles in the tank (not shown), the air is retained in the liquid to transfer a high percent of the oxygen into the liquid. It has been found that 10 cubic feet of air per minute per horsepower can be put through the venturis with nearly 75% of the oxygen transferring into the liquid of this type of application.

It should be noted that the air intake into air pump 40 of FIG. 7 is advantageously supplied by an Aran generator 39 which is somewhat similar to an ozone generator. The main difference is that Aran is composed of four and five oxygen atoms per molecule instead of three oxygen atoms as in Ozone. The advantage of using Aran generator 39 is that the efficiency of transfer of oxygen into the liquid in the storage tank is significantly enhanced since Aran and Ozone which are actually both produced by generator 39 are highly unstable. A still further advantage of using Aran is that it provides a sterilization effect as it is introduced into the tanks via the venturis. This can be further controlled by the plenum 41 which splits the flow from blower 40 and Aran generator 39. Note that air duct pipes 38 and 42 which extend from above the surface of the tanks to the venturis (35 and 36) on the pumps can under some circumstances be all that is needed to supply the air flow to satisfy the reduced pressure created in the venturi. However, blower 40 between generator 39 and plenum chamber 41 can be arranged to maintain positive static air pressure such as by pumping 415 cubic feet per minute and maintaining a static pressure of 3 inches. Thus the system not only satisfies the venturi vacuum but, by the positive pressure, potentially doubles the amount of air induced into the liquid. This could result in reducing the horsepower demand on pumps 30 by 50% since the purpose of pumps 30 is to induce air and oxygen into tanks 11 and 25.

In the system thus described, every precaution is taken to conserve the wastes being removed from the confinement feeding facility. The waste is flushed from the flumes with aerobic material from the primary aerator tank 11 on a continuous basis. The solids are separated and removed in a matter of minutes and made available to be put into a silo for fermentation from storage bin 21. After the solids portion of the waste has been placed in a silo and allowed to ferment for typically twenty-one to twenty-eight days, the propionic, acetic and lactic acids which evolve in the ensiling or fermentation process of such materials tends to enhance the digestibility and palatability for potential recycling or feeding.

Figures 2, 6:
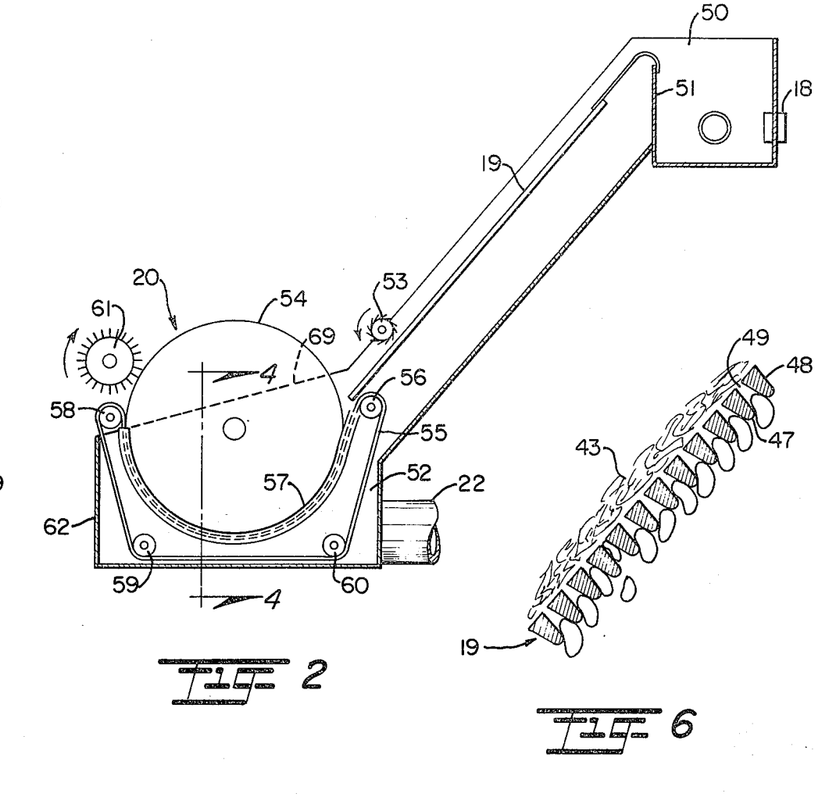
FIG. 2 is a partially cross-sectional view of the press roll separator shown in FIG. 1.
FIG. 6 is a section view of a typical wedge wire section taken along line 6—6 of FIG. 3.
Figure 3:
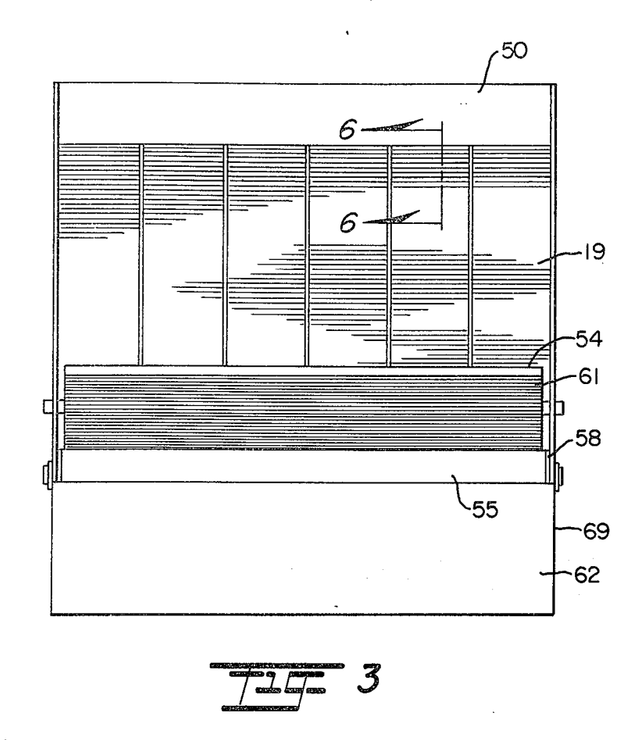
FIG. 3 is a front view of the press roll separator of FIG. 2.

The unique filter and rotary press combination shown generally in FIG. 1 is particularly advantageous for separating solids from liquids and illustrated in greater detail in FIGS. 2–6. This rotary press is particularly advantageous for this application since it is relatively simple but still economical and efficient in operation. As seen in FIG. 2, the discharge from pipe 18 from sump pump 17 is introduced to chamber 50 until it reaches the apex of solid back wall 51 and overflows down wedge wire screen 19. As can be seen in FIGS. 2, 3, and 6, wedge wire screen 19 is composed of a series of wedge-shaped horizontal bars such as 47 and 48 with a small lateral gap 49 therebetween. Typically, bars 47 and 48 have an upper surface of 3/16 inches which are separated by 0.010 inches of open space, e.g. gap 49. Thus, as reservoir 50 overflows so that waste material 43 flows down the face of screen 19, the liquids will be permitted to enter collection chamber 52 and eventually escape from pipe 22 back into aerator tank 11 (note FIG. 1). Eventually the materials sliding down the surface of screen 19 will reach rotary spreader wheel 53 which rotates as indicated against the flow of the materials and prevents jamming against the drum 54.

Drum 54 is arranged in proximity to an endless belt 55 which typically is a nylon material. By applying rotary power to drum 54, materials which reach the bottom of screen 19 are squeezed between belt 55 and drum 54, thereby removing further moisture for collection in chamber 52. By making belt 55 somewhat porous such as by a woven configuration, the liquid escape from between nylon belt 55 and drum 54 into collection chamber 52 will be augmented. Typically, belt 55 would be of a net configuration with up to 3/16 inch spacings but any fluidically porous arrangement can be used. The primary purpose of belt 55 is to support liquid flow therethrough while allowing positive feed of solids 66 into the roller press. Belt 55 also reduces friction between drum 54 and filter basket 75 (note FIG. 5).

Belt 55 is retained in position relative to drum 54 by an idler roller 56, a slotted tube 57, and an additional idler roller 58, the latter being vertically adjustable to maintain appropriate tension in belt 55. The endless loop of belt 55 is completed via rollers 59 and 60. The solids which have been thus compressed are removed by rotating brush 61 so as to drop over the front surface 62 of collection chamber 52 and thence into storage bin 21.

FIG. 4 shows the interrelationship of the drum and belt and represents a section along line 4—4 of FIG. 2. More particularly, drum 54 has a rubber coating 65 for interfacing with nylon belt 55 with the compressed waste material being shown therebetween at 66. The edge of belt 55 is guided by slotted tube 57 which extends for approximately one-half of the circumference of drum 54 as is shown in FIG. 2 and is attached to sidewall 68 of the rotary press. The opposite sidewall 69 shown in FIG. 2 has a slotted guide tube attached thereto similar to 57. The idler rollers such as 60 as can be seen in FIG. 4 have slotted grooves (70) around the periphery at each end thereof which receives the edge bead 71 of belt 55 and further provides guidance therefor.

The interrelationship of the slotted guide tube 57 and edge bead 71 is more clearly seen in FIG. 5. In addition, FIG. 5 illustrates the relationship of a wedge wire basket 75 which extends around the circumference of drum 54 in substantially the same manner as guide slot 57 shown in FIG. 2. The particular cross-section of the arcuate bars forming basket 75 as shown in FIG. 5 is advantageous in that it provides a generally rigid means for retaining endless belt 55 in proximity to drum 54 while still providing relatively free flow of liquid therethrough. In a typical example, screen filter 75 has approximately 0.010 inch spacings with a screen thickness of about ½ inch.

For a typical cattle confinement feeding application, drum 54 has a diameter of 31.5 inches and is driven at 1 rmp of rotation, spreader 53 has a 6.5 inches diameter and 30 rmp of rotation, and scraper brush 61 is of a 4 inch diameter with 40 rpm of rotation. More particularly, drum 54 is composed of a 30 inch diameter steel cylinder with a ¾ inch thick forty durometer rubber coating 65 molded on the outside with a 31.5 inch outside diameter finish. Wedge wire 19 is of the dimensions mentioned with a 6 foot width and 5 foot slope at 50° to the horizontal. The use of a stainless steel wedge wire screen 19 and the relatively low rotating speed (one to two rpm) of drum 54, minimum energy is required and friction and wear are also minimized while obtaining maximum separation. The efficiency of the system can be improved and operating costs reduced by including a fan 40 for pressurizing plenum 41 from which air ducts 38 and 42 are run to the vent pipes 38 and 42 leading to the venturis in the bottom of the aeration tanks 11 and 25.

By way of example, assume the present invention is being adapted to accommodate confinement feeding of two thousand steers which average 40 pounds of waste per day. This waste is 85% moisture containing 1.5 pounds Biological Oxygen Demand. If 60% of the 40 pounds were removed as liquid containing 6% solids, there would be 24 pounds of liquid that would contain 1.58 pound of solids. In the 40 pounds of waste there was 6 pounds of dry matter and they contained 1 ½ pounds Biological Oxygen Demand; then 1.58 pounds of dry matter in liquid portion would contain 0.2531 pounds Biological Oxygen Demand per steer per day times two thousand steers equals 506.2 pounds Biological Oxygen Demand daily. A 5 horsepower pump would add 50 cubic foot of air per minute or 72,000 cubic foot of air per day and would equal 65 cubic feet per 1 pound of oxygen of 1108 pounds dissolved oxygen. With 50% oxygen transfer, a 5 horsepower motor 40 in FIG. 7 on a pump would furnish enough oxygen for two thousand cattle.

A 21 foot diameter by 21 foot deep tank 11, allowing 1 foot freeboard provides a capacity of 6927 cubic feet, or 51,954 gallons. This amount of storage will allow 9.2 days retention time for the liquid portion of the waste from two thousand cattle, assuming no loss through aeration, and disregarding the volume of liquid that would be in the flushing system of the barn (1,000 feet long) continuously.

With a 5 horsepower motor 40 being used on a Parma pump 30 with a double venturi, 10 cubic feet of air per minute per horsepower can be put into the liquid at a depth of approximately 18 feet below the surface. At this rate, 72,000 cubic feet of air would be induced every twenty-four hours. If we assume 1 pound of oxygen in each 65 cubic feet of air, there would be 10,191 pounds of oxygen induced for each daily production of Biological Oxygen Demand with the calculated Biological Oxygen Demand being 506.2 pounds per day. Thus, aeration treatment will be completed in the 9.2 days retention time.

In converting the Dissolved Oxygen requirements to pounds of Dissolved Oxygen per horsepower hour in this particular application: 5 horsepower times twenty-four hours times 9.2 days retention equals 1104 horsepower hours. 506.2 pounds of Biological Oxygen Demand times 2 pounds of Dissolved Oxygen required equals 1012.4 pounds of Dissolved oxygen. 1012.4 pounds of Dissolved Oxygen required per 1104 horsepower hours equals 0.917 pounds Dissolved Oxygen per horsepower hour which would be required to furnish 2 pounds Dissolved Oxygen per 1 pound Biological Oxygen Demand.

Since the industry has accepted the rate of Oxygen Transfer per horsepower hour to be 2 pounds per horsepower hour, when working a mechanical aerator in a 2% solids liquid, containing a constant 1 P.P.M. - Dissolved Oxygen - a safe general margin is projected. Instead of mechanical type aerators such as surface aerators of paddle wheel types prevalent in the prior art, the present invention via the venturi configuration assures that the air is broken up into minute portions and mixed well into the liquid well below the surface. The solids involved in this liquid are typically of 10/1000 of an inch or less. Surface area per pound of Biological Oxygen Demand in the solids involved are much greater than the average waste material.

Although the present invention has been described with particularity relative to the foregoing preferred embodiment, many modifications, additions and changes will be readily apparent to those having normal skill in the art without departing from the spirit of this invention.

What is claimed is:

1. Apparatus for separating solids and liquids from a mixture thereof comprising:
    screen means having an upper substantially flat surface oriented in sloped relation to a horizontal plane at an angle for permitting gravitational flow of said mixture over said surface,
    means for introducing said mixture to the upper portion of said screen means surface, said flat surface of said screen means being formed by a plurality of parallel bars arranged in a spaced relation for defining a plurality of transverse slots, the width of said slots being arranged to accommodate fluidic passage of the liquid from said mixture therethrough while blocking passage of the solids from said mixture,
    liquid filter means,
    means receiving said mixture from the lower portion of said screen means for compressing said received mixture against said liquid filter, and
    means for receiving the liquids passing through said screen means and said liquid filter means whereby the mixture after passing over said screen means as a result of the gravitational flow and after being compressed against said liquid filter means will have a reduced liquid content.

2. Apparatus in accordance with claim 1 wherein each of said parallel bars has a first surface forming part of the said flat surface and sidewalls extending therefrom in converging relation so that the said transverse slot defined between adjacent said parallel bars increases in width below said flat surface.

3. Apparatus in accordance with claim 2 wherein said parallel bars are each oriented so that the length thereof is substantially horizontal.

4. Apparatus in accordance with claim 1 wherein said means receiving said mixture from said screen means includes cylindrical drum means having the axis thereof parallel to the plane of said flat surface, means for imparting rotary motion to said drum, said liquid filter means including endless belt means for following the circumferential motion of said drum means and for compressing said mixture received from said screen means against said drum means, said endless belt means being sufficiently porous to permit fluidic passage therethrough.

5. Apparatus in accordance with claim 4 wherein said liquid filter means further includes a fixed liquid filter having an arcuate configuration for retaining a relatively constant spacing between said endless belt and said drum.

6. Apparatus in accordance with claim 5 wherein said fixed filter and said endless belt are arrayed around the lower circumferential portion of said drum, said fixed filter including a plurality of arcuate spaced bars for permitting the liquid passing through said endless belts to pass through the spacing between said bars.

7. Apparatus in accordance with claim 6 wherein said means for receiving liquids from said screen means is further arranged for receiving liquids from said fixed filter, said apparatus further including means for removing compressed material from said drum means after said material has passed between said drum means and said endless belt means.

8. Apparatus for separating solid and liquids from a mixture comprising:
  a cylindrical drum means,
  means for imparting rotary motion to said drum means,
  filter means arrayed around the lower peripheral area of said drum means, said filter means including a plurality of spaced bars arranged for forming an arcuate surface in surrounding relation relative to the lower peripheral area of said drum means,
  fluidically porous endless belt means arranged to move between said spaced bars and said drum means for compressing said mixture against said drum means,
  means introducing said mixture between said drum means and said filter means at the point the peripheral edge of said drum means is rotationally moving downward for compressing said mixture between said drum means and said filter means, and
  means for collecting the liquid passing through said endless belt and the space between said spaced bars, whereby liquid from said mixture will pass through said filter means while solids will pass between said drum and will be discharged at the peripheral edge of said drum when said drum is moving upward.

9. Apparatus in accordance with claim 8 wherein said spaced bars are arcuate and arrayed for providing arcuate fluid passing slots therebetween, the sidewall of each said bar being convergent so that said fluid passing slots are relatively narrow at the area closest to the peripheral surface of said drum means and diverge away from said drum surface to a relatively wider area.

10. Apparatus in accordance with claim 9 wherein said endless belt means has a bead along each edge thereof, said apparatus further including grooved guide means along the outer peripheral edges relative to said drum means for slidably retaining said belt across the lower peripheral surface of said drum means.

11. A system for producing feed supplements from animal waste materials comprising:
  liquid storage means,
  an animal feeding area,
  means communicating liquid from said storage means for washing animal waste materials from said feeding area,
  means receiving said waste material containing liquid from said feeding area for substantially separating the solids and liquids thereof,
  means for returning said separated liquids to said liquid storage means,
  means for aerating said liquid in said storage means,
  means for withdrawing liquid substantially at the surface of said storage means,
  vat means,
  means receiving the liquid from said withdrawing means for separating solids and liquids and for communicating the liquids thus separated to said vat means, and
  means for aerating the liquids in said vat means whereby the separated solids after fermentation are usable as dry feed supplements and the aerated said liquids from said vat means can be used for animal drinking water supplementation.

12. Apparatus in accordance with claim 11 wherein said feeding area liquid receiving means includes a sloped wedge wire filter means for permitting the waste material containing liquid to flow thereover so that the liquids will pass through said filter into a collection chamber for return to said liquid storage means, and means for receiving the solids which pass over said wedge wire filter means.

13. Apparatus in accordance with claim 12 which includes a rotating drum, and an arcuate fluidically porous filter arranged for compressing the materials flowing from the end of said sloped wedge wire filter against said rotating drum for transferring the solids to said solid receiving means and for communicating liquids passing through said arcuate filter into said separated liquids returning means.

14. Apparatus in accordance with claim 13 wherein said arcuate filter includes an arcuate wedge wire basket arranged in proximity to the lower peripheral area of said rotating drum, and a fluidically porous endless belt movably interfacing between said belt and said lower peripheral area of said drum for compressing the materials flowing from the end of said sloped wedge wire filter against said drum.

15. Apparatus in accordance with claim 11 which includes means for pumping air, said first and second mentioned aerating means each including means for receiving air from said pumping means and means for dispersing said receiving air within respective said liquid storing means and said vat means at a location in proximity to the bottoms thereof.

16. Apparatus in accordance with claim 15 which further includes first and second means for pumping liquid in said liquid storage means and said vat means, respectively, said dispensing means each including venturi means for mixing liquid received from the associated said liquid pumping means and air received from said air pumping means.

17. Apparatus for recovering animal feed supplements from animal wastes comprising:

a confinement feeding area having a plurality of downwardly sloped channels extending transversely across the floor thereof with said floor being composed of a plurality of pairs of surfaces with each said pair being sloped downwardly into a respective said channel, first and second storage tanks, means for coupling liquid from said first storage tank to said channels for gravitationally collecting animal waste materials from said confinement feeding area, a holding bin, means receiving the said collected animal waste material for separating the solids and liquids thereof so as to discharge the separate solids into said holding bin and return the separate liquids to said first storage tank, means for withdrawing liquid near the surface of the contents of said first storage tank, means separating the solids and liquids in said withdrawn liquid for discharging the separated solids into said holding bin and for transferring the separated liquids into said second storage tank, and means for dispersing air into the liquids near the bottom of said storage tank whereby the separated solids collected in said holding bin can be used for dry feed supplementation after appropriate fermentation while liquids contained in said second storage tank can be used for adding food value supplementation to the feed water for animals in said confinement area.

18. Apparatus in accordance with claim 17 wherein said separating means both include a wedge wire filter having a sloped slotted surface for allowing the receiving materials to gravitationally flow thereacross so that the liquids will pass through the slots of said surface while the solids across said surface for discharge into said holding bin.

19. Apparatus in accordance with claim 18 wherein said collected animal waste material separating means further includes:

rotating drum means, a wedge wire basket having an arcuate surface arranged in proximity to the lower peripheral area of said rotating drum, and a fluidically porous endless belt arranged as a movable interface between said lower peripheral area of said drum and said wedge wire basket, said belt and said drum being positioned for receiving solids flowing from the said wedge wire filter surface associated with said collected material separating means and for compressing the received solids therebetween, liquids passing through said belt and said basket being collected for return to said first storage tank solids while the compressed solids are discharged into said holding bin.

20. Apparatus in accordance with claim 19 which further includes means sweeping the surface of said drum as it rotates out of proximity to said endless belt for removing any compressed material therefrom and augmenting discharge of said compressed solids into said holding bin.

21. Apparatus in accordance with claim 20 which includes air pumping means, said air dispersing means each including means for pumping liquid in the associated said tank and venturi means for combining air from said air pumping means and the said associated liquid pumping means.

22. Apparatus in accordance with claim 21 wherein said air pumping means includes means for injecting unstable oxygen molecules into the air supplied to said venturi means.

23. Apparatus in accordance with claim 22 wherein said injecting means includes an Aran generator for providing the intake air for said air pumping means.

24. A method of recovering animal feed value from animal waste materials comprising the steps of:

collecting animal waste materials from an animal feeding area, separating the solids and liquids from the collected waste material, aerating the separate liquids in a storage container, withdrawing some of the liquid from said storage container, further separating solids and liquids from said withdrawn liquid, aerating the liquid from said further separating step in a second container, fermenting the solids from said separating and further separating steps, adding the fermented said solids to the dry feed for the animals, and supplementing the feed water for the animal with the liquid from said second container.

25. A method in accordance with claim 24 wherein said separating step includes the steps of:

passing the collected waste material over a surface having a series of transverse fluid passing slots, and communicating liquids passing through said slots to said storage container.

26. A method in accordance with claim 25 wherein said separating step further includes the steps of:

compressing the solids remaining after said passing step between a substantially continuous surface and a fluidically porous surface, and further communicating liquids passing through said porous surface to said storage container.

27. A method in accordance with claim 26 wherein said further separating step includes the steps of:

flowing the said withdrawn liquid over a second surface having a series of transverse fluid passing slots, and transferring liquids passing through said second surface slots into said second container.

* * * * *

PO-1050
(5/69)

UNITED STATES PATENT OFFICE
CERTIFICATE OF CORRECTION

Patent No. 3,982,499          Dated September 28, 1976

Inventor(s) Gerald P. Frankl

It is certified that error appears in the above-identified patent and that said Letters Patent are hereby corrected as shown below:

Column 3, line 7, cancel "are" and substitute --and--.

Column 7, line 12, cancel "rmp" and substitute --rpm--.

Column 7, line 13, cancel "rmp" and substitute --rpm--.

Column 7, line 39, cancel "pounds" (2nd occurrence) and substitute --pound--.

Column 7, line 46, cancel "of" (2nd occurrence) and substitute --or--.

In The Claims:

Column 9, Claim 6, line 24, cancel "belts" and substitute --belt--.

Column 11, Claim 17, line 15, cancel "separate" and substitute --separated--.

Column 11, Claim 17, line 16, cancel "separate" and substitute --separated--.

Column 11, Claim 18, line 37, after "solids" add --will slide--.

Column 12, Claim 24, line 24, cancel "separate" and substitute --separated--.

Column 12, Claim 24, line 35, cancel "animal" and substitute --animals--.

Signed and Sealed this

Twenty-ninth Day of March 19

[SEAL]

Attest:

RUTH C. MASON
Attesting Officer

C. MARSHALL DANN
Commissioner of Patents and Trademarks